Figures 1, 2:
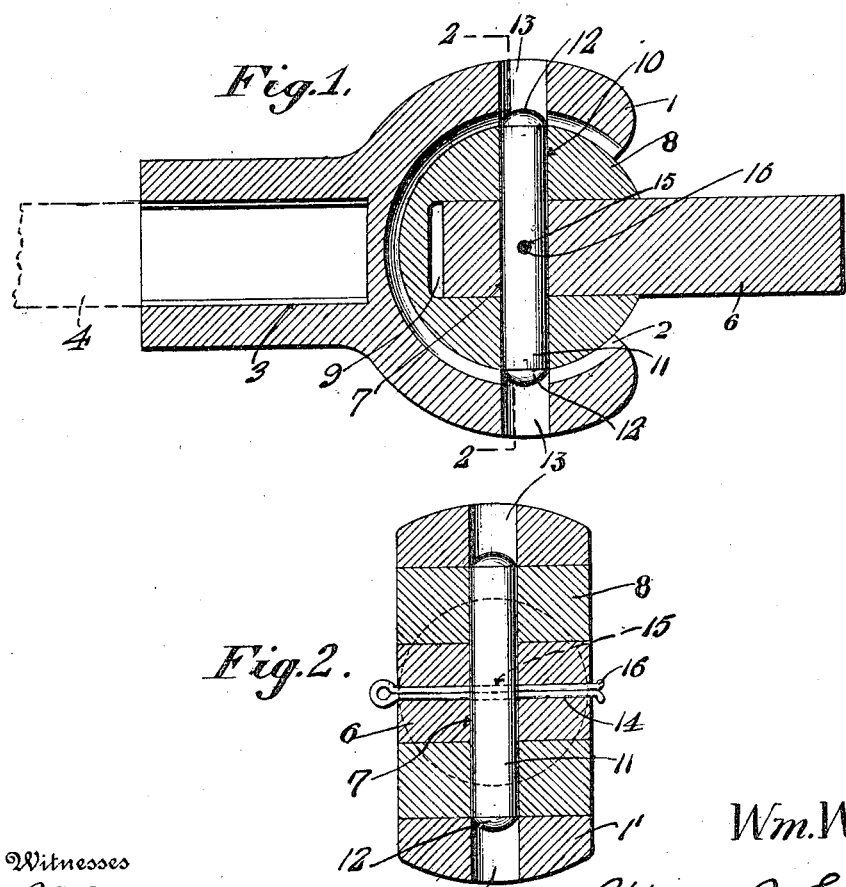

W. W. PECK.
UNIVERSAL JOINT.
APPLICATION FILED OCT. 7, 1916.

1,232,600.

Patented July 10, 1917.

Witnesses
R. E. Rousseau.

Inventor
Wm. W. Peck.
By Victor J. Evans
Attorney

UNITED STATES PATENT OFFICE.

WILLIAM W. PECK, OF MUNCIE, INDIANA.

UNIVERSAL JOINT.

1,232,600.  Specification of Letters Patent.  Patented July 10, 1917.

Application filed October 7, 1916. Serial No. 124,363.

*To all whom it may concern:*

Be it known that I, WILLIAM W. PECK, a citizen of the United States, residing at Muncie, in the county of Delaware and State of Indiana, have invented new and useful Improvements in Universal Joints, of which the following is a specification.

This invention relates to improvements in the construction of universal joints.

An object of the invention is to produce a universal joint of such a construction that any of the several parts thereof may be readily removed for repairs, etc.

A further object of the invention is to construct a universal joint which shall be simple but strong and efficient for the purpose required and which shall present the maximum bearing surface in proportion to its diameter so that torsional strain will be distributed over the largest possible area, and the parts will not have to be casehardened to eliminate wear.

A further object of the invention is to provide a universal joint that may be manufactured with the ordinary tools and equipment found in any ordinary machine shop, and from material common to such shops.

I accomplish the purposes above enumerated and others which will be apparent as the nature of the invention is more fully understood, by a construction and arrangement of parts such as illustrated by the accompanying drawings, in which:

Figure 1 is a central longitudinal sectional view through a universal joint constructed in accordance with the present invention, and Fig. 2 is a transverse sectional view approximately on the line 2—2 of Fig. 1.

A universal joint constructed in accordance with the present invention comprises essentially a yoke member 1, the said yoke having its jaw portion shaped to form a transverse circular depression which is of a greater area than one-half of a circle, and the said jaw is approximately centrally provided with a continuous rounded groove 2. The jaw may be and preferably is connected to a socket 3 within which is arranged the driven shaft 4. The drive shaft is indicated by the numeral 6 and is provided, adjacent one of its ends with an opening 7.

The second member of the joint proper includes a solid cylindrical member 8 of a size to be snugly received in a rounded jaw in the yoke, the said member 8 being centrally provided with a slot or opening arranged longitudinally therethrough and indicated by the numeral 9 and being further provided with a reduced centrally disposed rounded opening 10 arranged transversely of the opening 9. The opening 9 is adapted to receive the end of the drive shaft 6, a pin 11 passing through the opening 10 and through the opening 7 in the drive shaft 7, the said pin having its opposite ends rounded, as at 12, to be received within the groove or channel 2 in the jaw of the yoke. To facilitate the insertion of the pin 11, as above described, the yoke 1 has its jaws provided with alining openings 13 of a size to insure the passage of the pin therethrough so that the same may pass through the openings in the member 8 and through the opening 7 in the drive shaft 6.

As it is also essential that the rounded ends 12 of the pin 11 be at all times properly arranged in the groove 2 I provide the shaft 6 centrally with a transverse opening 14 which intersects the opening 7, and likewise I centrally provide the pin 11 with an opening 15 designed to aline with the opening 14 when the rounded ends of the pin are properly arranged with respect to the groove 2 in the head or yoke 1, and I pass through these alining openings a holding element, preferably in the nature of a cotter pin 16. By this arrangement it will be also noted that strain between the shaft and the hub and the hub and jaw will be equally distributed between these members and the pin.

Having thus described the invention, what I claim is:

1. A universal joint including a yoke member adapted to be connected with a shaft and including a rounded jaw, said jaw having its inner face provided with a continuous depression, and having an opening communicating with the depression, a hub comprising a solid cylindrical member arranged within the jaw, a pin member having rounded ends passing through the opening in the jaw and received in the depression in the said jaw and securing the hub within the jaw, a shaft connected with the pin, and means passing transversely through the shaft and pin for holding the rounded ends of the pin within the depression of the jaw.

2. A universal joint including a yoke member adapted to be connected with a shaft and including a rounded jaw, said aw having its inner face provided with a continuous depression, a hub comprising a solid cylindrical member arranged within the jaw, said hub having an opening in one of the ends thereof, a shaft arranged in the opening, a pin member having rounded ends pivotally securing the shaft to the hub and projecting beyond the hub and received in the depression in the jaw, and means passing transversely through the shaft and pin for securing the pin to the shaft and for retaining the rounded ends of the pin within the depression of the jaw.

In testimony whereof I affix my signature.

WILLIAM W. PECK.